J. Van. De. Water.
Mower.

No. 113,225.   Patented Mar. 28, 1871.

Witnesses:
Phil. T. Dodge
Geo. W. Ellery

Inventor:
Joseph Van De Water

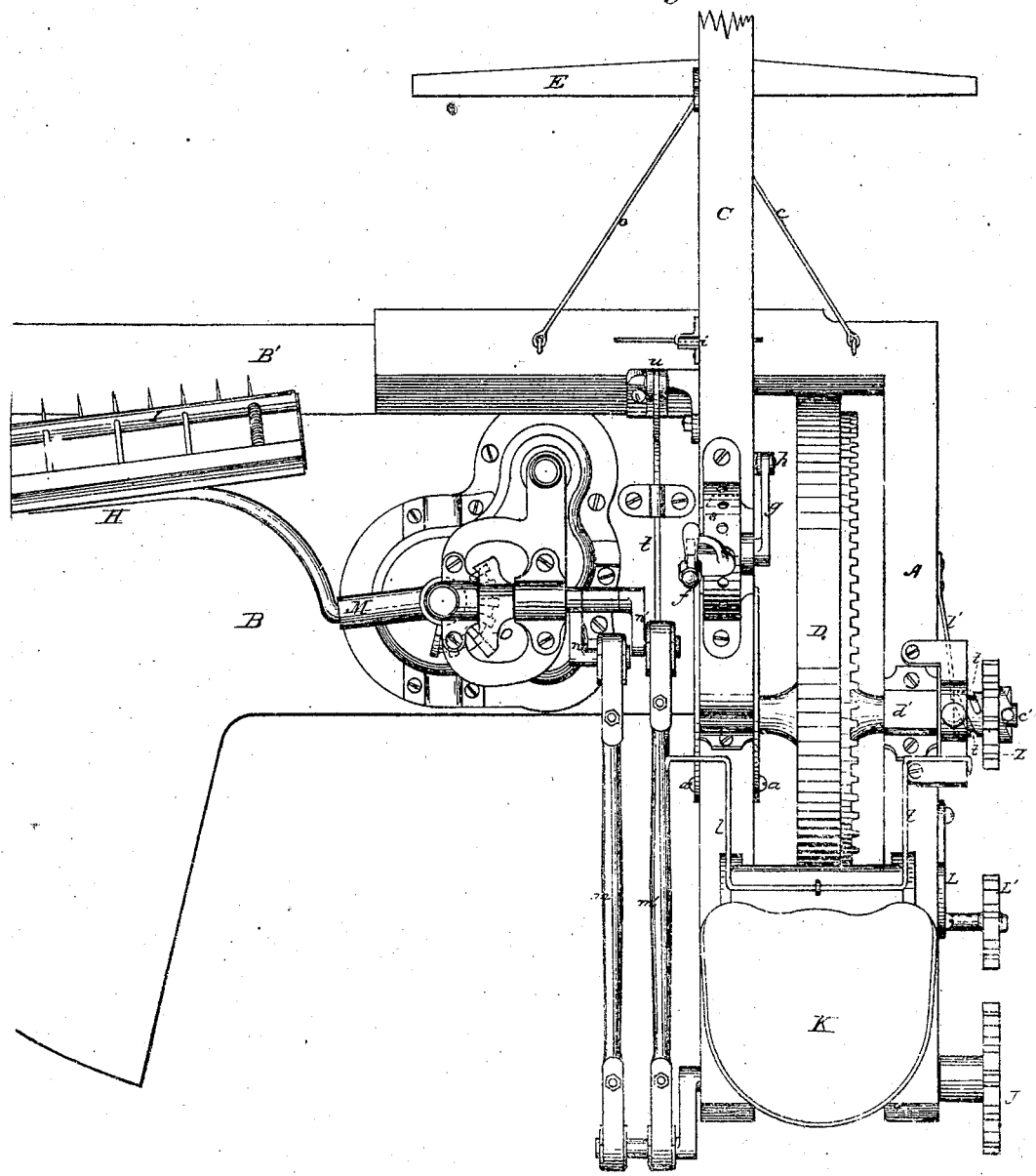

J. Van De Water,
Mower.

No. 113,225.    Patented Mar. 28, 1871.

Witnesses:
Geo. W. Esterly
Phil. T. Dodge

Inventor:
Joseph Van De Water

J. Van De Water.
Mower.

No. 113,225.

4 Sheets. Sheet 4.

Patented Mar. 28, 1871.

Witnesses:
Phil. T. Dodge

Inventor:
Joseph Van De Water

UNITED STATES PATENT OFFICE.

JOSEPH VAN DE WATER, OF WHITEWATER, WIS., ASSIGNOR TO HIMSELF, GEORGE ESTERLY, AND GEORGE W. ESTERLY, OF SAME PLACE.

IMPROVEMENT IN HARVESTERS.

Specification forming part of Letters Patent No. 113,225, dated March 28, 1871.

*To all whom it may concern:*

Be it known that I, JOSEPH VAN DE WATER, of Whitewater, in the county of Walworth and State of Wisconsin, have invented certain Improvements in Harvesters, of which the following is a specification, reference being had to the accompanying drawing.

My invention relates to automatic reaping-machines; and the invention consists in a novel construction and arrangement of the various parts, as hereinafter more fully described and enumerated, whereby a very perfect automatic reaper is produced.

Figure 1:
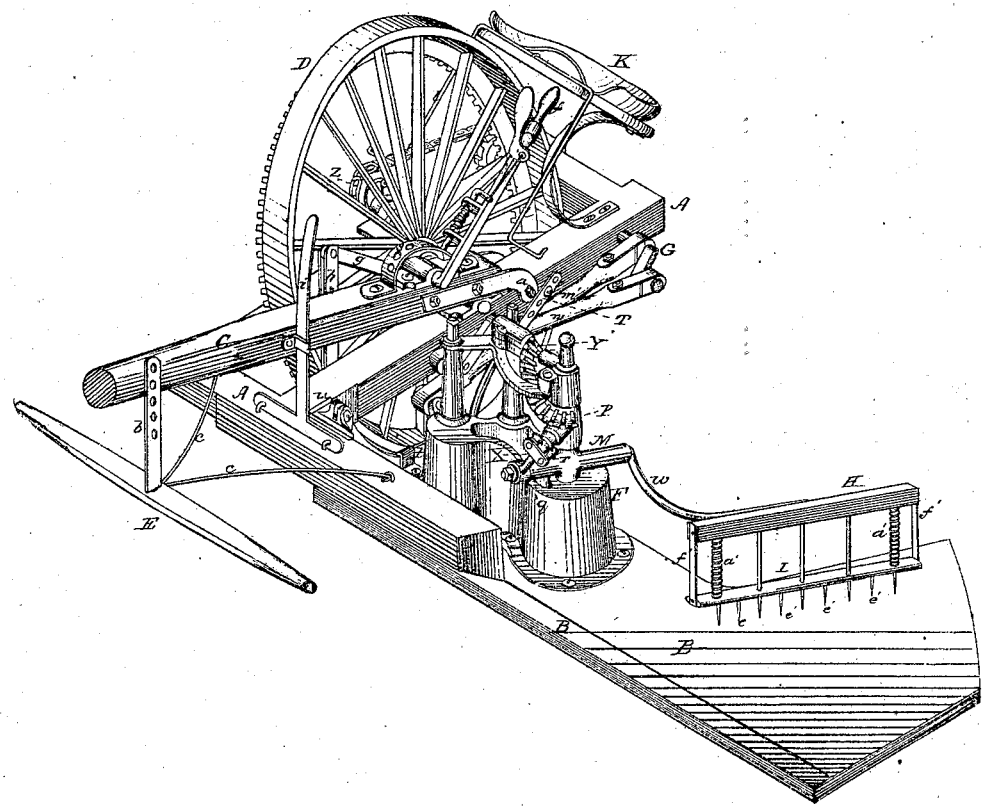
Figure 8:
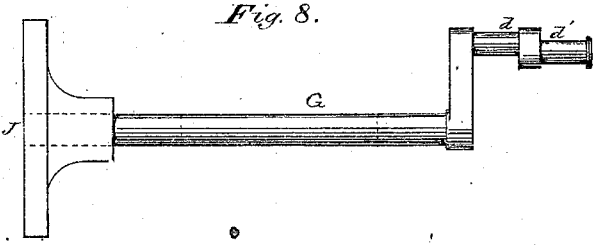
Figure 9:
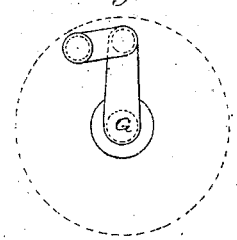
Figure 3:
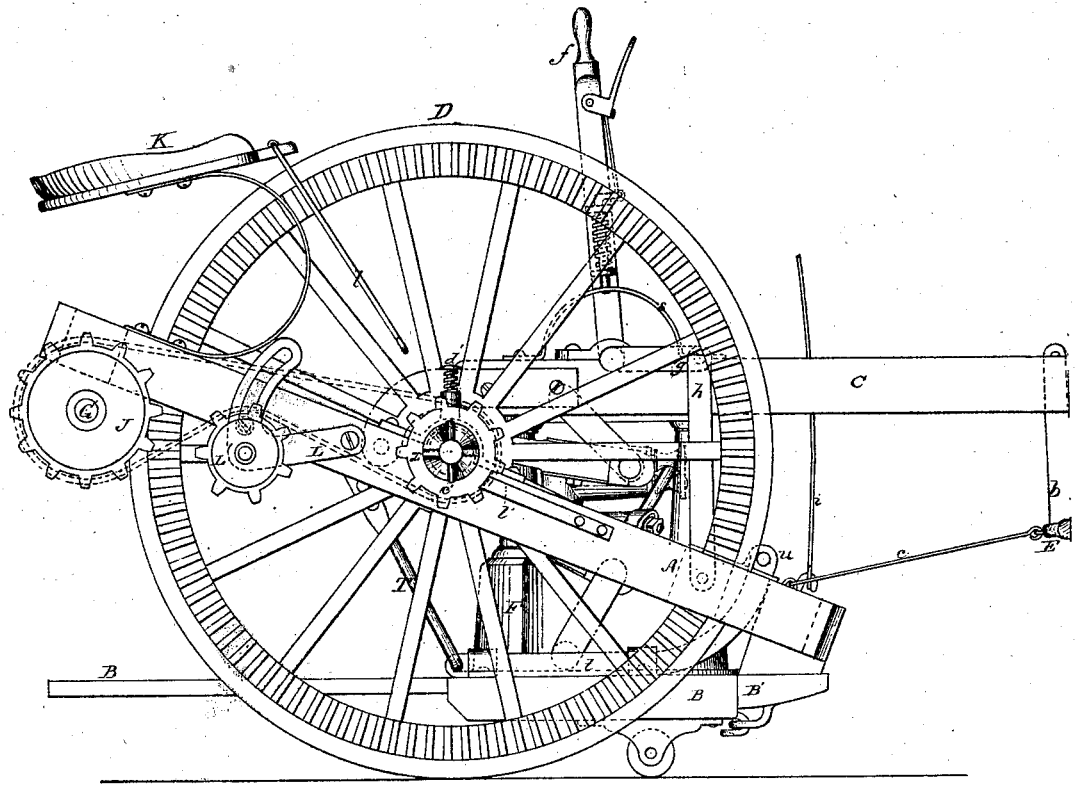
Figure 5:
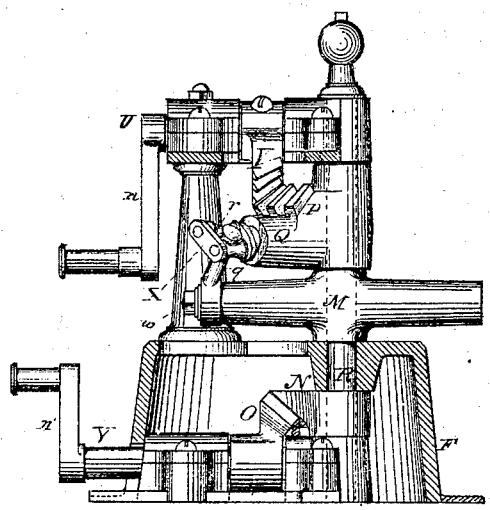
Figure 6:
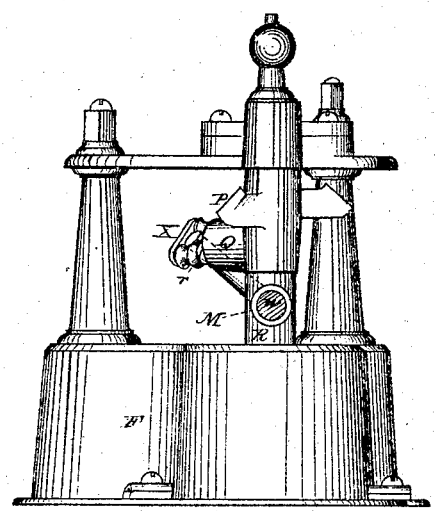
Figure 7:
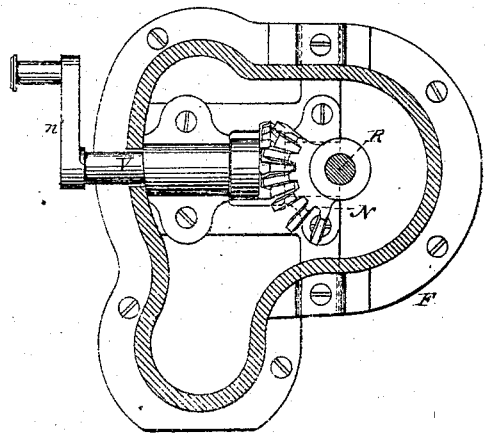

Figure 1 is a perspective view of the machine as a whole. Fig. 2 is a top-plan view of the same. Fig. 3 is a side elevation, and Fig. 4 an under or bottom-plan view, showing the manner of connecting the platform to the cutter-bar. Figs. 5, 6, and 7 are views representing more in detail the mechanism for operating the rake.

In constructing my improved machine I make a rectangular oblong frame, A, and mount it upon a single wheel, D, in the usual or in any suitable manner. To this frame I pivot a tongue, C, the joint or pivot $a$ being located in rear of the axle, so that when the team is backed the tendency will be to raise the front of the machine from the ground, the pressure being applied to the upper side of the frame behind the axle, and thereby depressing the rear and elevating the front parts of the machine.

An evener or double-tree, E, is connected to the front end of the frame A, as shown in Figs. 1, 2, and 3, so that the draft, instead of being upon the tongue, is upon the frame direct, this evener E being located at some little distance in front of the frame and below the tongue, to which latter it is connected by a rigid bar, $b$, which is provided with a series of holes, by which the evener can be raised or lowered as may be desired, and to correspond also with the vertical adjustment of the tongue.

There is also a bar, $i$, attached to the front end of the frame in such a manner as to allow it to move forward and backward at its upper end, but prevent any lateral movement, as shown in Fig. 1, this bar $i$ sliding in a staple or loop on the tongue, so as to permit the tongue to be raised or lowered, and at the same time to brace the tongue to prevent lateral movement of the same.

To enable the driver to adjust the height of the tongue, or of the frame to the tongue, while on the machine, I pivot upon the tongue, in front of the axle, and within reach of the driver, a lever, $f$, which has connected rigidly to it an arm, $g$, projecting at right angles along the opposite side of the tongue, as shown in Figs. 1, 2, and 3, and which arm is connected at its end to a bar, $h$, the lower end of which is connected to the frame A near its front. By moving this lever forward or backward the front end of the frame is lowered or raised.

Upon the tongue, alongside of the lever $f$, is secured a segmental bar, $s$, having a series of holes in it, in which engages a spring-catch attached to the lever $f$ in such a manner that it can be operated in the act of grasping the lever, this latter being a well-known device. By these means the frame, when adjusted, can be locked rigidly to the tongue.

Upon the frame, in rear of the wheel, is mounted a seat, K, for the driver, and from the front part of this seat is suspended a rod, $l$, which terminates on each side below in a stirrup for the driver's feet to rest in, this rod being pivoted to the seat in such a manner that the stirrups can be swung forward or backward, to accommodate the position of the driver's feet and enable him to change their position at will, as shown in Figs. 1, 2, and 3.

Figure 4:
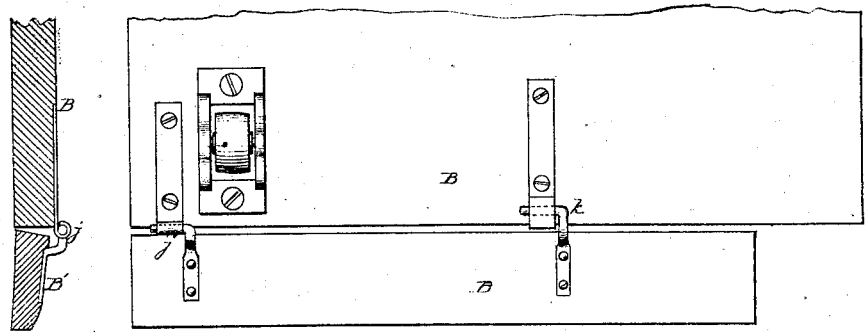

The platform B is hinged to the cutter-bar B', as represented in Figs. 3 and 4, the inner hinge, $k$, as shown in Fig. 4, being so constructed as to allow of a little play forward and backward, thus permitting the inner front corner of the platform, upon which the rake is mounted, to swing slightly to and from the cutter-bar when the rear inner corner of the platform is raised or lowered, the object of this being to enable the rake mechanism to retain its position relative to the operating-cranks at the rear end of the frame, so as to avoid the necessity of changing the length of the pitmen which connect the rear cranks with those on the platform when the platform is raised or lowered, as will be more apparent when the rake mechanism is described.

In addition to the hinges $j$ and $k$, (shown in Fig. 4,) there is also a bar, $t$, secured to the upper side of the platform, along its inner edge, as shown in Fig. 2, this bar being curved upward at its front end and hinged at $u$ to the upper side of the cutter-bar B', or to the frame A at that point, as represented in Fig. 3. At its rear end this bar $t$ is connected by a rod or bar, T, to the side of the frame, there being a series of holes in the bar T, by which the rear end of the platform can be adjusted, so as to keep the distance uniform between the cranks on the frame and those of the rake.

It will be observed that as the inner corner of the platform, as it is adjusted, turns on the joint $v$, which is above the platform, the latter is necessarily thrown a little back as it is raised, and forward as it is lowered.

Upon the inner side of the platform, at its front, is mounted the mechanism that operates the rake. This mechanism is supported in a frame, F, having two standards connected at the top by a plate, as shown in Fig. 6, this frame affording bearings for the mechanism proper.

The rake H has a curved arm, $w$, the end of which forms a shaft or journal, this latter being mounted loosely in a horizontal sleeve, M, which is attached rigidly to a vertical shaft, R, which has its bearings in the frame F, as shown more clearly in Figs. 5, 6, and 7. Secured to this shaft R, near its lower end, is a horizontal segmental bevel-pinion, N, which engages with a similar pinion, O, on a horizontal shaft at the bottom of the frame F, this latter shaft, V, having a crank, $n'$, on its outer end, as shown in Figs. 5 and 7.

By means of these devices the rake H has imparted to it a circular movement in a horizontal plane, causing it to move from the front of the platform around backward to its inner side.

Upon the top of the frame F, I then mount another horizontal shaft, U, which has at its outer end a crank, $n$, and to which is also secured a vertical segmental bevel-pinion, Y, which engages in a similar pinion, P, mounted loosely on the vertical shaft R, as shown in Figs. 5 and 6. To this latter pinion P is secured a horizontally-projecting sleeve or hub, Q, in or on the end of which I journal a yoke, X, which embraces loosely the end of an arm, $q$, which is attached rigidly to the end of the rake-shaft $w$, where the latter protrudes through the sleeve M, as represented in Figs. 1, 5, and 6.

To prevent any binding of the parts and insure their free working, the yoke X is provided with two concave friction-rollers, $r$, between which the arm $q$ works. These devices are intended to give to the rake a rising-and-falling movement at the required intervals—that is to say, they turn the shaft $w$ of the rake so as to bring the latter down upon the platform as it is swung around to the front, and raise it up again as it arrives at the rear of the platform. In order to impart to the rake these two movements—one in a horizontal and the other in a vertical plane—it becomes necessary that the upper and lower pinions should commence their movements at different intervals; and to accomplish this I locate at the rear end of the frame A a transverse horizontal shaft, G, as represented in Figs. 1, 2, and 3. On the end of the shaft nearest the platform I make two cranks, which stand at a little less than right angles to each other, as shown in Figs. 1, 2, 8, and 9, and which cranks are connected by two pitmen, $m$ and $m'$, to the cranks $n$ and $n'$ of the shafts U and V, as shown in Figs. 1 and 2. These front cranks, $n$ and $n'$, are considerably longer than the cranks of the shaft G, so that, while these last perform an entire revolution, the cranks $n$ and $n'$ have imparted to them simply an oscillating or rocking motion, about one-third of a revolution in extent. The result of this arrangement is that, as the shaft G rotates, the pitman $m'$ operates to turn the sleeve M in such a manner as to swing the rake from the rear forward through the air until it reaches the limit of its forward movement, the pitman $m$ then operating the upper shaft and set of pinions in such a manner as to throw the sleeve Q forward, thereby turning the rake-shaft $w$ in its sleeve M and throwing the rake down upon the front of the platform, ready to seize the grain, and continuing its movement in the same direction in unison with the pitman $m'$ and the lower set of pinions. The rake is thereby swept in a circular track across the platform, sweeping off the grain in its movement.

Just at the instant that the rake reaches the rear edge of the platform the upper set of pinions become stationary by the position at that instant of the pitman $m$ and its cranks, while the lower set of pinions continue their motion long enough to swing the sleeve M a sufficient distance to turn the shaft $w$ in its sleeve, and thereby raise the rake up into the air to its highest position, when both pitmen move backward, thus swinging the rake forward in this elevated position, until, having carried it to the proper point, the lower set of pinions become stationary for a moment, (while their pitman $m'$ is passing the dead-center of its rear crank,) when the upper set commences to move forward, thereby turning the shaft $w$ in its sleeve and throwing the rake down upon the front of the platform, as before, and so on continuously.

It will thus be seen that the rake has imparted to it four distinct movements—first, (supposing it to start from the front,) it moves back in a circle over the platform; second, it is turned up into the air; third, it is carried forward in this elevated position; and, fourth, it is turned down upon the front of the platform.

It is obvious that to produce these movements at the exact intervals required the length of the various cranks and their angles must be properly adjusted relatively to each other, and that by such adjustments, which is merely a matter of calculation, a rake operating on this plan or by these means may be adapted to platforms of various sizes, and also that the extent of its movements may, in like manner, be varied by simply changing the length of the cranks or the size of the pinions.

It is also obvious that the rake may be thus operated by using a single pitman by substituting for the other the proper stops and trips, they becoming in that case the mere equivalents of the second pitman.

To impart motion to the shaft G, and thereby to the rake, it has secured to its opposite end a sprocket-wheel, J, as shown in Figs. 2 and 3. This wheel is connected by a chain with a similar wheel, Z, mounted loosely on the outer end of the axle. This wheel Z has on its outer face a series of inclined notches with right-angled shoulders, which, when the machine moves forward, engage with a pin, $c'$, in the outer end of the axle, thereby locking the wheel to the axle and causing it to turn with the axle, a spring, $l'$, serving to keep the wheel Z pressed outward against the pin. By this means the axle carries the wheel around with it when the machine moves forward, but when the machine is backed the inclined faces of the notches release it from connection with the pin, and it, with the shaft G and the rake mechanism, remains stationary.

In order to stop the motion of the rake at any time while the machine is moving forward, and to hold it suspended for any required length of time, I construct the wheel Z with an inwardly-projecting hub, which has formed in its outer surface a series of spiral grooves, $t$, as shown in Fig. 2, and in the box or frame directly over the inner end of this hub I locate a vertical loose bolt or pin, $d'$, which has a flat head and is held up by a spiral spring, as shown in Fig. 3. The driver by pressing his foot upon the head of this pin $d'$ forces it down, thereby causing its lower end to engage in one of the inclined grooves $t$, which, as the wheel revolves, draws the wheel Z inward toward the frame, and, of course, disconnecting it from the pin $c'$, by which means the motion of the rake is stopped. In this way the rake can be stopped at any point in its movement, and held in that position so long as the driver chooses to keep the pin $c'$ depressed, and by simply removing his foot the rake will again resume its movements.

To keep the chain taut and to compensate for wear, I pivot to the side of the frame a swinging plate, L, which carries a tightening-wheel, L', as shown in Fig. 3, by adjusting which the chain can be regulated as may be necessary.

In order to make the rake operate with certainty, whether the grain be heavy or light, I provide a bar, I, having a series of holes in it, through which the teeth of the rake H can protrude when the bar I is slipped thereon, as represented in Figs. 1 and 2. The bar I is provided with a set of teeth, $e'$, which are so located as to alternate with the teeth of the rake proper, standing midway between the latter. A couple of spiral springs, $a'$, are slipped onto two of the teeth of the rake H before the bar I is put on, these springs serving to keep the bar I with its teeth pressed down, as shown in Fig. 1, the bar being connected at its ends by straps $f'$ to the head of the rake H, thereby preventing the springs $a$ from pushing it beyond a point at which the ends of its teeth $e'$ are brought in line with the end of the teeth of the rake H.

The bar I with its teeth when thus arranged operates not only as a compressor to press the grain down snugly upon the platform, but also as an auxiliary and adjustable or yielding rake, which adapts itself automatically to the quantity of grain on the platform, and thus operates equally well in either light or heavy grain.

By this plan of constructing the machine I am enabled to produce a very complete and perfectly-operating harvester, with an automatic rake that is completely under control of the operator.

It is obvious, however, that parts of my improvements may be applied separately to other machines—as, for instance, the rake mechanism, the manner of hinging the platform, and the method of disconnecting the rake—these all being capable of being used separately in other machines.

The combination or arrangement of all these improvements in a single machine, as here represented, however, produces a very compact and perfect machine, and is the manner in which I prefer to use them.

Having thus fully described my invention, what I claim is—

1. The platform B, hinged to the cutter-bar B' by means of the joints $j$, $k$, and $u$, whereby the inner front corner of the platform is made to swing to or from the cutter-bar when its rear end is adjusted, substantially as described, for the purpose of adjusting the relative position of the cranks, as set forth.

2. The combination of the rock-shafts U and V, with their pinions attached, the shaft R, with its sleeve M, pinions P and N, and yoke X, and the rake-shaft $w$, with the tripping-arm $q$ attached, substantially as described.

3. In combination with the mechanism last-above enumerated, the shaft G, with its two cranks, and the pitmen $m$ and $m'$, arranged and operating as set forth.

4. The compound rake consisting of the rake-head H, with its teeth, and the bar I, with its teeth $e'$, the springs $a'$, and straps $f'$, all arranged as shown and described.

JOSEPH VAN DE WATER.

Witnesses:
H. O. MONTAGUE,
EDWARD P. BURROWS.